United States Patent [19]

Becker

[11] 4,395,235

[45] Jul. 26, 1983

[54] FOUR PIVOT LINKAGE TO SIMULATE HEAD/NECK KINEMATICS

[75] Inventor: Edward B. Becker, Riverhead, N.Y.

[73] Assignee: The United States of America as represented by the Secretary of the Navy, Washington, D.C.

[21] Appl. No.: 344,916

[22] Filed: Feb. 2, 1982

[51] Int. Cl.³ .............................................. G09B 23/32
[52] U.S. Cl. ....................................... 434/270; 248/284
[58] Field of Search ....................... 248/278, 282, 284; 434/256, 265, 267, 268, 270, 274, 275

[56] References Cited

U.S. PATENT DOCUMENTS

| | | | |
|---|---|---|---|
| 657,502 | 9/1900 | Swan .................................... | 248/284 |
| 1,148,436 | 7/1915 | Blain .................................... | 248/282 |
| 1,418,820 | 6/1922 | Mansure .......................... | 248/278 X |
| 3,557,471 | 9/1968 | Payne et al. . | |
| 3,562,924 | 3/1969 | Baerman et al. . | |
| 3,664,038 | 5/1972 | Searle .................................. | 434/274 |
| 3,707,782 | 1/1973 | Alderson .............................. | 434/267 |
| 3,740,871 | 6/1972 | Berton et al. . | |
| 3,753,301 | 6/1972 | Daniel et al. . | |
| 4,349,339 | 9/1982 | Daniel ................................. | 434/274 |

FOREIGN PATENT DOCUMENTS

| | | | |
|---|---|---|---|
| 2358716 | 3/1978 | France ................................. | 434/274 |
| 708395 | 1/1980 | U.S.S.R. .............................. | 434/274 |

Primary Examiner—Harland S. Skogquist
Attorney, Agent, or Firm—R. F. Beers; Francis I. Gray

[57] ABSTRACT

A four pivot linkage to simulate head/neck kinematics. The linkage has a pitch-roll link which rotates about a first pivot fixed in an upper body and which secures the lower end of a neck link in a second pivot. The upper end of the neck link is secured in a third pivot fixed in a yaw-pitch link which in turn articulates about a fourth pivot fixed in a head.

2 Claims, 2 Drawing Figures

FOUR PIVOT LINKAGE TO SIMULATE HEAD/NECK KINEMATICS

BACKGROUND OF THE INVENTION

1. Field of the Invention

The present invention relates to anthropomorphic dummies used in crash testing, and more particularly to a four pivot linkage to simulate head/neck kinematics for such dummies.

2. Description of the Prior Art

Head and neck mechanisms currently used in anthropomorphic dummies are not based upon scientific measures of living human response to impact. Therefore, there exists observed differences between the impact response of human volunteers and that of current dummies which show that the dummy neck systems are particularly deficient. See "Hybrid III-A Biomechanically Based Crash Test Dummy", Paper 770938 by J. King Foster, James O. Kortge and Michael J. Wolanin, Proceedings of 21st Stapp Car Crash Conference, SAE, Inc., (1977); and "Comparison of Kinematic Parameters between Hybrid II Head and Neck System with Human Volunteers for $-G_x$ Acceleration Profiles", Paper 760801 by William M. Muzzy III and Leonard Lustick, Proceedings of 20th Stapp Car Crash Conference, SAE, Inc., (1976). What is desired is a head/neck kinematic system which more accurately depicts living human response to impact in order to design safer and more efficient impact protection systems for use in all kinds of vehicles.

SUMMARY OF THE INVENTION

Accordingly, the present invention provides a four pivot linkage to simulate head/neck kinematics. The linkage has a pitch-roll link which rotates about a first pivot fixed in an upper body and which secures the lower end of a neck link in a second pivot. The upper end of the neck link is secured in a third pivot fixed in a yaw-pitch link which in turn articulates about a fourth pivot fixed in a head.

Therefore, it is an object of the present invention to provide a head/neck kinematic system which simulates live human response to impact.

Other objects, advantages and novel features will be apparent from the following detailed description when read in conjunction with the appended claims and attached drawing.

DESCRIPTION OF THE PREFERRED EMBODIMENT

A head/neck kinematic system must reproduce all the head versus first thoracic vertebral (T−1) body positions of a living human subjected to frontal, lateral and oblique crash impact. This data has been obtained from human volunteers who underwent short duration accelerations approximating these impacts while being monitored by anatomically mounted clusters of inertial transducers and photographic targets. The data is analyzed to identify a spatial linkage which will reproduce the actual head/neck kinematics.

There are three aspects to this linkage: its form, its geometry and its articulation. The form applies to the whole range of humanity, and even to the primates used in impact testing. The geometry consists of those parameters which apply the general form to a single individual, but which are constant over each individual's entire history barring changes due to injury, disease or advancing age. The articulation consists of those parameters that identify a particular head versus T-1 position, and that vary with time, describing the individual's head versus T-1 response to impact.

Figure 1:
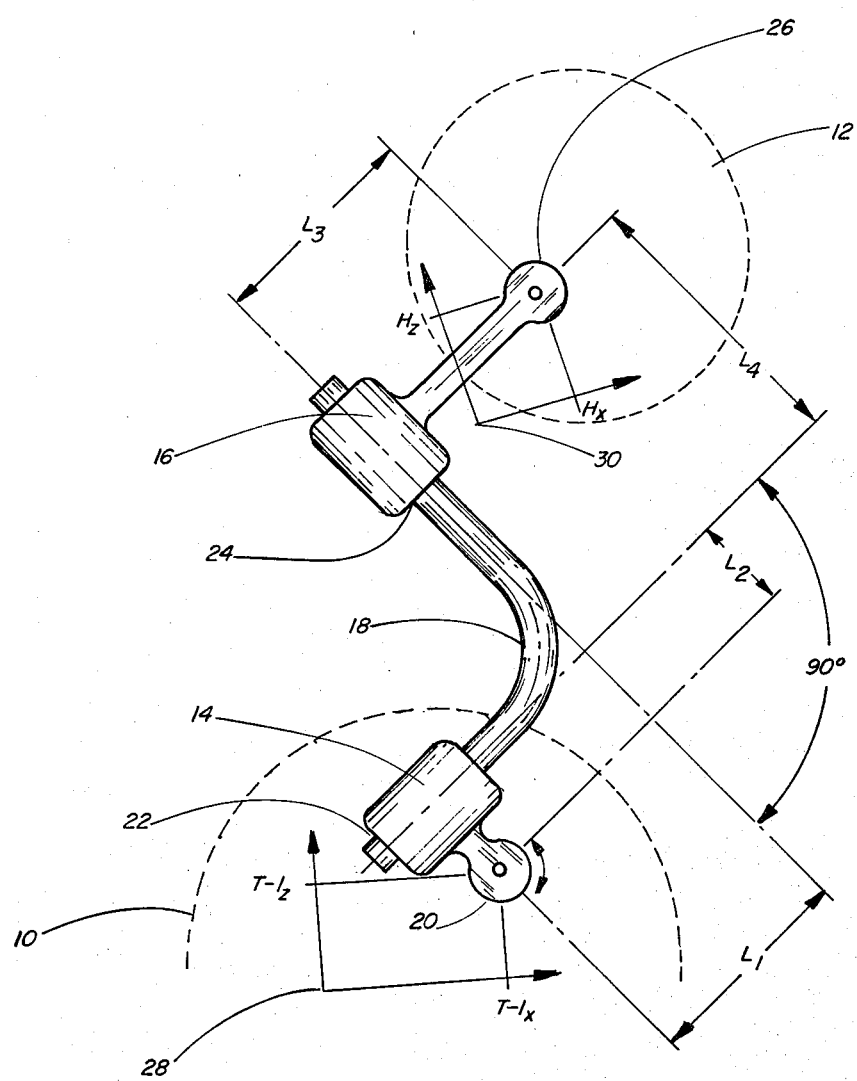
FIG. 1 is a schematic view of a four pivot linkage to simulate head/neck kinematics according to the present invention.

Referring now to the FIG. 1, a torso 10 and a head 12 for an anthropomorphic dummy is shown. At the T-1 position of the torso 10 is rotatably connected a pitch-roll link 14. A yaw-pitch link 16 likewise is rotatably connected to the head 12. A neck link 18 connects the pitch-roll link 14 and the yaw-pitch link 16. The upper end of the neck line 18 is pivotally connected to the yaw-pitch link 16, and the lower end is pivotally connected to the roll-pitch link 14. The result is a four pivot linkage: the first pivot 20 being at the T-1 position, the second pivot 22 being at the neck link 18/roll-pitch link 14 connection, the third pivot 24 being at the neck link/yaw-pitch link 16 connection, and the fourth pivot 26 being at the head.

The four pivot linkage has, within the limits imposed by midsagittal symmetry, nine geometrical parameters. Fixing the angle formed by the axes of the two interior pivots—the second pivot 22 and the third pivot 24—at ninety degrees reduces the parameters to the eight lengths indicated in the FIG. 1. The lengths T-$1_x$ and T-$1_z$ are measured along the x and z axes of the T-1 coordinate system 28, $H_z$ and $H_x$ are measured along the head coordinate system 30. These lengths define the position of the exterior pivots—the first pivot 20 and the fourth pivot 26. $L_1$ defines the length from the first pivot 20 to the axis of the third pivot 24, $L_2$ defines the length from the first pivot to the axis of the second pivot 22, $L_3$ defines the length from the fourth pivot 26 to the axis of the third pivot, and $L_4$ defines the length from the fourth pivot to the axis of the second pivot.

The identification process for the geometric parameters is iterative. A likely set of geometrical parameters is selected and compared to the actual data from a single volunteer. The articulational parameters are fitted for each data position of the volunteer and the quality of these fits is examined over the entire data set. This examination suggests a new set of geometrical parameters which are then subjected to the same comparison. This process leads to the best set of geometrical parameters that the linkage form affords for the particular volunteer.

Figure 2:
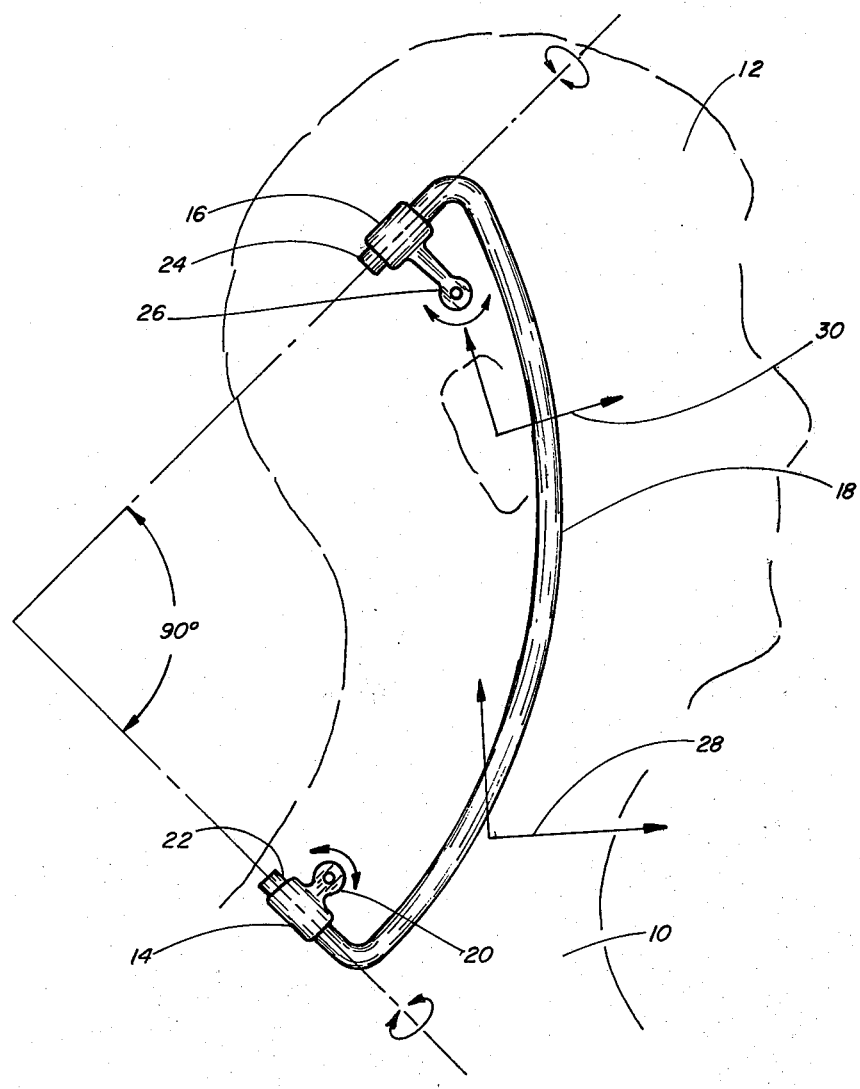
FIG. 2 is a schematic view of a four pivot linkage suitable for use in an anthropomorphic dummy.

FIG. 2 shows a particular linkage selected from a range of linkages which fit the observations equally well for its mechanical suitability for use in anthropomorphic dummy design. For a particular volunteer the geometric parameters were: T-$1_x = -6.54$ cm, T-$1_z = -1.42$ cm, $L_1 = 16.17$ cm, $L_z = -1.41$ cm, $L_3 = 3.10$ cm, $L_4 = 21.36$ cm, $H_x = -0.04$ cm and $H_z = 5.84$. The performance of this linkage versus the data set resulted in a residual weighted average displacement error of 0.017 mm. The result of eigenvector analysis demonstrate that the range of acceptable linkage geometrics is large without increasing the mean square residual beyond one percent.

Thus, the present invention provides a four pivot linkage to simulate head/neck kinematics whih closely approximates the actual kinematics of a living human subjected to frontal, oblique and lateral crash impacts.

What is claimed is:

1. An apparatus for simulating head/neck kinematics comprising:

a roll-pitch link having means for pivotable attachment to the torso of an anthropomorphic dummy;

a yaw-pitch link having means for pivotable attachment to the head of said anthropomorphic dummy; and;

a neck link having an arcuate form, the upper end of said neck link being pivotally connected to said yaw-pitch link and the lower end of said neck link being pivotally connected to said roll-pitch link such than when said apparatus is attached to said anthropomorphic dummy a four pivot linkage is formed between the torso and the head.

2. An apparatus as recited in claim 1 wherein the pivot axes of the upper and lower ends of said neck link are orthogonal.

* * * * *